United States Patent [19]
Toya et al.

[11] Patent Number: 5,982,140
[45] Date of Patent: Nov. 9, 1999

[54] CHARGER

[75] Inventors: Shoichi Toya, Mihara-gun; Kouichi Fukukawa, Sumoto, both of Japan

[73] Assignee: Sanyo Electric Co., Ltd., Moriguchi, Japan

[21] Appl. No.: 09/046,640

[22] Filed: Mar. 24, 1998

[30]   Foreign Application Priority Data

Mar. 31, 1997 [JP] Japan ..................................... 9-080026

[51] Int. Cl.⁶ ........................................................ H02J 7/00
[52] U.S. Cl. ............................................. 320/110; 320/107
[58] Field of Search ................................... 320/110, 106, 320/113, 125; 429/96–100

[56]   References Cited

U.S. PATENT DOCUMENTS

| | | | |
|---|---|---|---|
| 5,138,351 | 8/1992 | Wiegand | 320/111 |
| 5,608,303 | 3/1997 | Leiserson | 320/113 |
| 5,621,311 | 4/1997 | Kamiya | 174/52 |

*Primary Examiner*—Peter S. Wong
*Assistant Examiner*—Lawrence Luk
*Attorney, Agent, or Firm*—Wenderoth, Lind & Ponack, L.L.P

[57]   ABSTRACT

The charger mounts a printed circuit board into a case and charging contact points are fixed on this printed circuit board. The charging contact points are connected to the electrodes of the batteries attached to the attachment section. The separating ribs in which the charging contact points mount and which are in contact with the upper face of the printed circuit board, are provided in the case. The charging contact points mounted in the inner side of these separating ribs, are exposed in the attachment section from the electrode windows of the case. The fluid which penetrated inside the case via the electrode windows is separated by the separating ribs and prevented from spreading at the surface of the printed circuit board and is drained outside the case through the drain canals provided in the case.

16 Claims, 6 Drawing Sheets

CHARGER

BACKGROUND OF THE INVENTION

The present invention relates to a charger to charge batteries, and especially relates to a charger preventing the failure of the electronic parts inserted into the case, due to the electrolyte leak from the battery or to water infiltration from the outside.

The charger has an attachment section provided in the case to allow the easy setting in at a fixed position and the easy taking out of the batteries or of the charging devices of electric apparatuses or the like mounted with a battery. Electrode windows are provided at a position facing the electrodes of the battery, charging contact points are exposed in these electrode windows. The charging contact points are connected to the electrodes of the batteries and charge the batteries.

When charging the batteries inserted into the attachment section of the case, some electrolyte leaks from the battery. For example, it happens that the electrolyte leaks when the battery is over charged. The reason is that when the battery is over charged, the inner pressure of the battery gets extremely high opening the safety valve. The leaking electrolyte penetrates inside the charger case through the electrode windows. The electrolyte that has penetrated into the battery case does not only cause a leakage of electricity or the like, but also provokes short circuits in the electronic parts or the corrosion of the electrical parts leading to a failure. The electronic parts are in a state easily leading to short circuits because the electrolyte that has penetrated inside the case, is a particularly conductive fluid. This drawback can be reduced by narrowing the space between the electrode windows and the charging contact points. But because the charging contact points are elastically deformable and are pushed by the charging terminals of the batteries or the like to be set to the attachment section, it is necessary to leave a space between the contacts points and the electrode windows which allows an elastically sufficient movement of the charging contact points. If the contact of the charging contact points with the electrode windows is made by rubbing, a smooth movement is no more realized and is the cause of the misconnection between the charger terminals and the charging contact points. For this reason, it is necessary to avoid the contact of the contact point with the electrode window, to surely allow the flexible pressing in of the charging contact point by the charger terminals of the battery or the like. It is therefore not possible to reduce the size of the electrode windows to avoid the penetration of the electrolyte.

Furthermore, not only electrolyte penetrates into the charger, but also water or the like via the electrode windows. Like the electrolyte, because water is also conductive, it causes leakage of electricity, and also causes electronic short circuits, or the corrosion of the electrical parts leading to a failure.

The present invention has been developed to avoid the drawback of the penetration of water or electrolyte into the case. The important scope of the present invention is to provide a charger which efficiently prevents the drawback of the electrolyte penetration inside the case through the electrode windows, and also surely prevents the internal short circuits and the corrosion.

The above and further objects and features of the invention will more fully be apparent from the following detailed description with accompanying drawings.

SUMMARY OF THE INVENTION

The charger of the present invention is mounted with a printed circuit board into a case. The printed circuit board fixes the charging contact points to be connected to the batteries electrodes. The contacts points of the charger are exposed in the electrode windows in the attachment section of the case, to connect the electrodes of the batteries to be attached to the attachment section. The charger of the present invention has furthermore the hereunder mentioned special structure.

(a) The charging contact points of the charger are fixed to the upper face of the printed circuit board and a part of them is exposed in the attachment section in the electrode windows of the case.

(b) The separating ribs are provided on the case, mounting the contacts points of the charger at the inner side, and in contact with the upper face of the printed circuit board; the charging contact points of the charger mounted in the inner side of these separating ribs being exposed in the attachment section inside the electrode windows of the case.

(c) The fluid penetrating inside the case from the electrode windows, is prevented from spreading out on the surface of the printed circuit board, being separated by the separating ribs, and drained out of the case by the drain canals provided in the case.

The charger of the present invention has the particularity to drastically reduce the failures due to fluids like the electrolyte or other fluids penetrating into the case. The reasons are that the region of the charger of the present invention near the charging contact points which are fixed on the upper face of the printed circuit board, is separated by the separating ribs, that drain canals are provided in the regions separated by these separating ribs and that the fluids which have penetrated into the case are drained out from the inner side of the separating ribs via the drain canals. The charger of the present invention has especially the particularity to efficiently prevent the spreading out on the printed circuit board of the fluids which have penetrated into the case along the charging contact points, because the separating ribs are in contact with the upper face of the printed circuit board preventing the spreading out of the fluids on the upper face of the printed circuit board. For this reason, the charger of the present invention succeeded in realizing the characteristics to prevent efficiently the drawback of the penetration of the electrolyte or the like into the case via the electrode windows and also to surely prevent the inner short circuits and the corrosion.

BRIEF DESCRIPTION OF THE DRAWINGS

The FIG. 1 is a figure showing an oblique view of the charger of an embodiment of the present invention.

The FIG. 2 is a figure showing an oblique view from the bottom of the charger shown in the FIG. 1.

Figure 1:
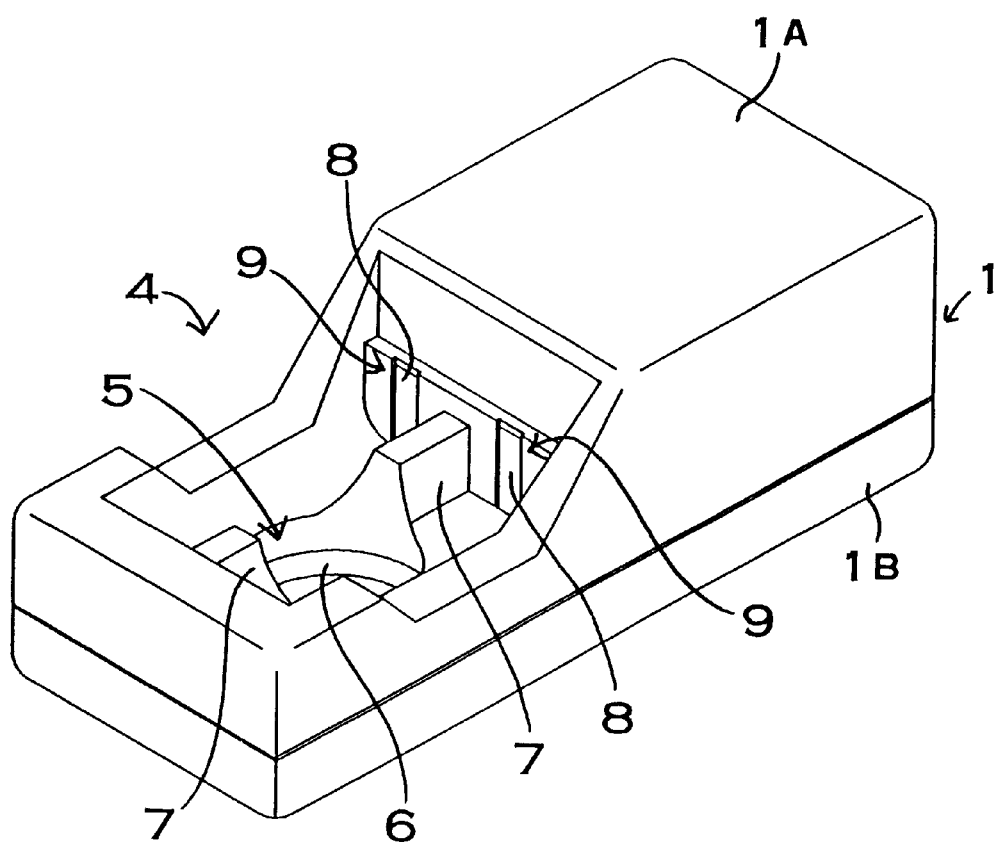
Figure 3:
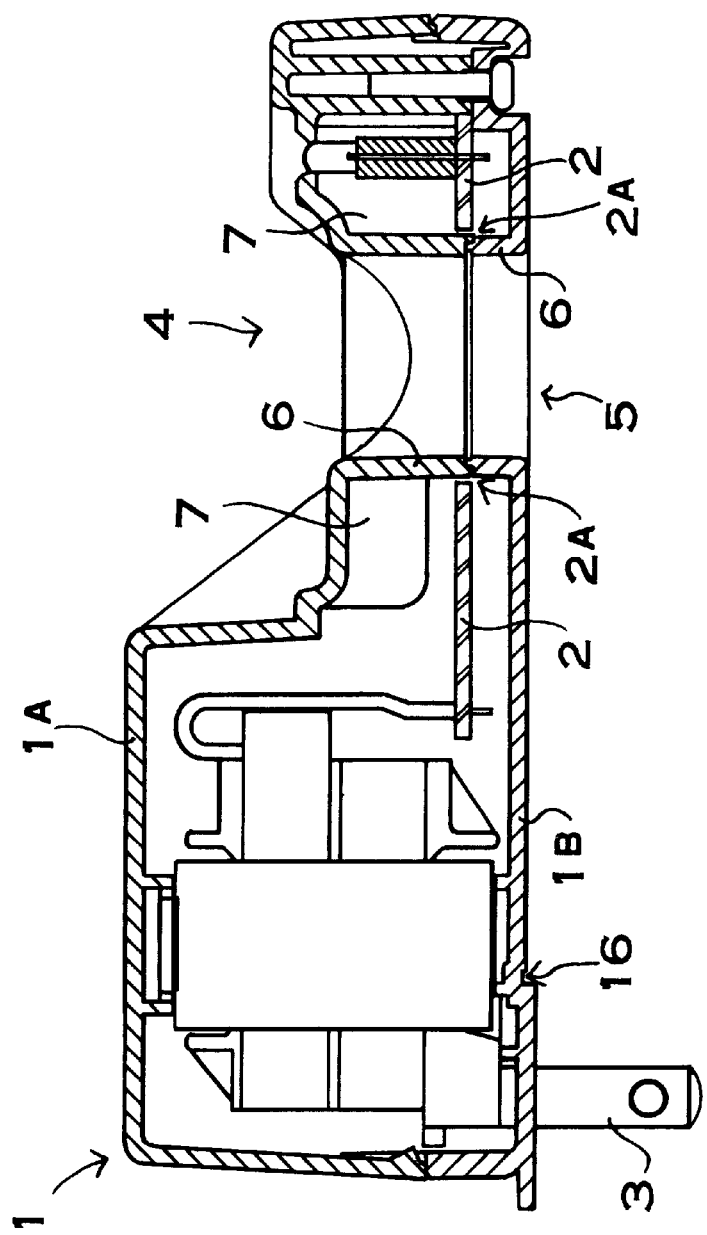

The FIG. 3 is a figure showing a vertical cross-sectional view across the middle of the charger shown in the FIG. 1.

Figure 4:
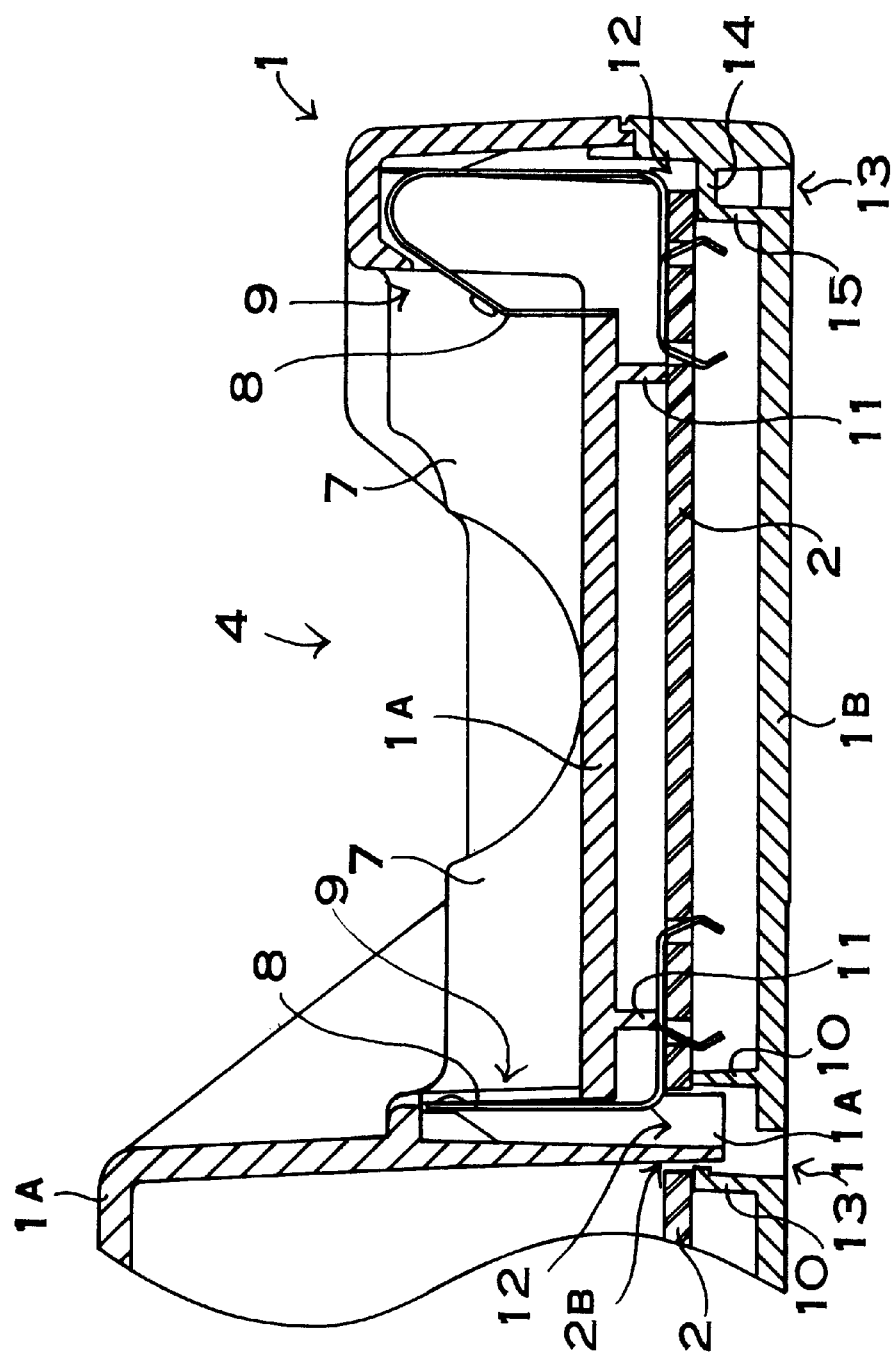

The FIG. 4 is a figure showing a vertical cross-sectional view across the charging contact points of the charger shown in the FIG. 1.

Figure 5:
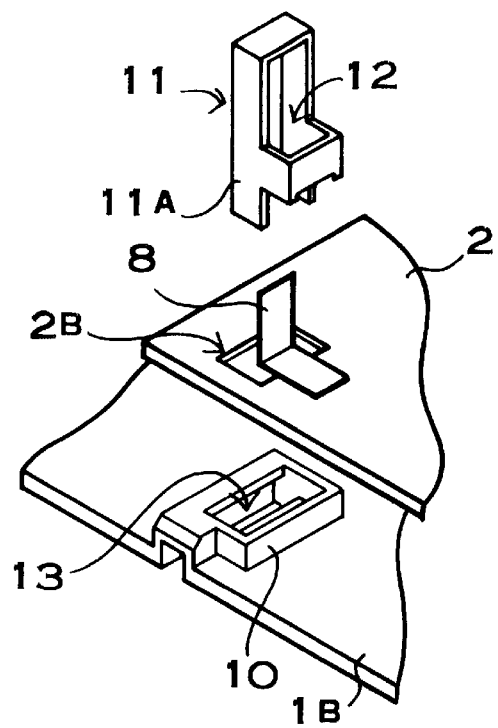

The FIG. 5 is a figure showing an exploded oblique view of the region of a positive charging contact point of the charger shown in the FIG. 4.

Figure 6:
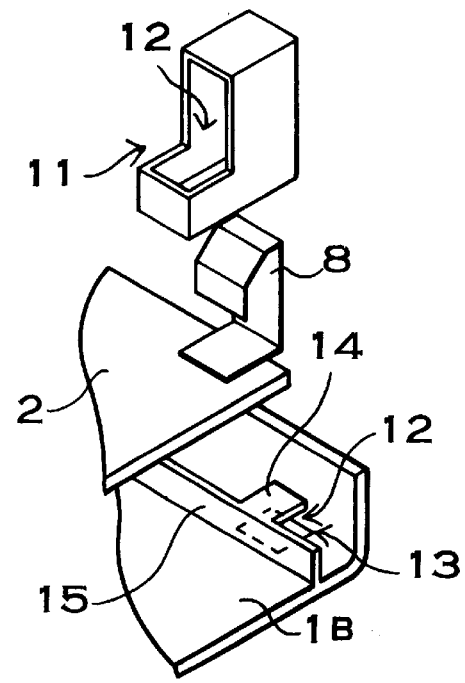

The FIG. 6 is a figure showing an exploded oblique view of the region of a negative charging contact point of the charger shown in the FIG. 4.

Figure 7:
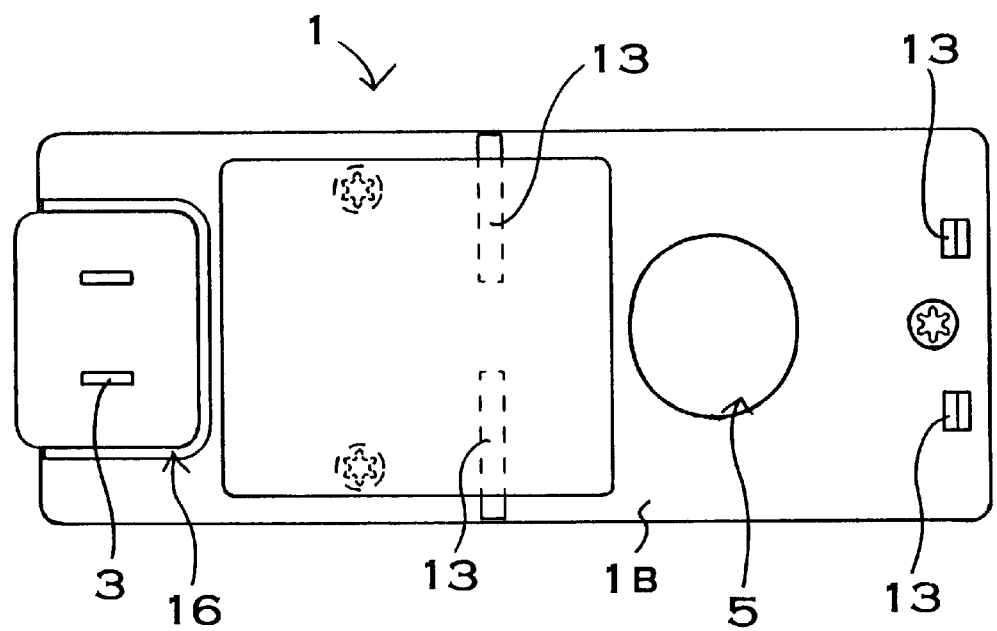

The FIG. 7 is a figure showing a bottom view of the charger shown in the FIG. 1.

DETAILED DESCRIPTION OF THE INVENTION

Figure 2:
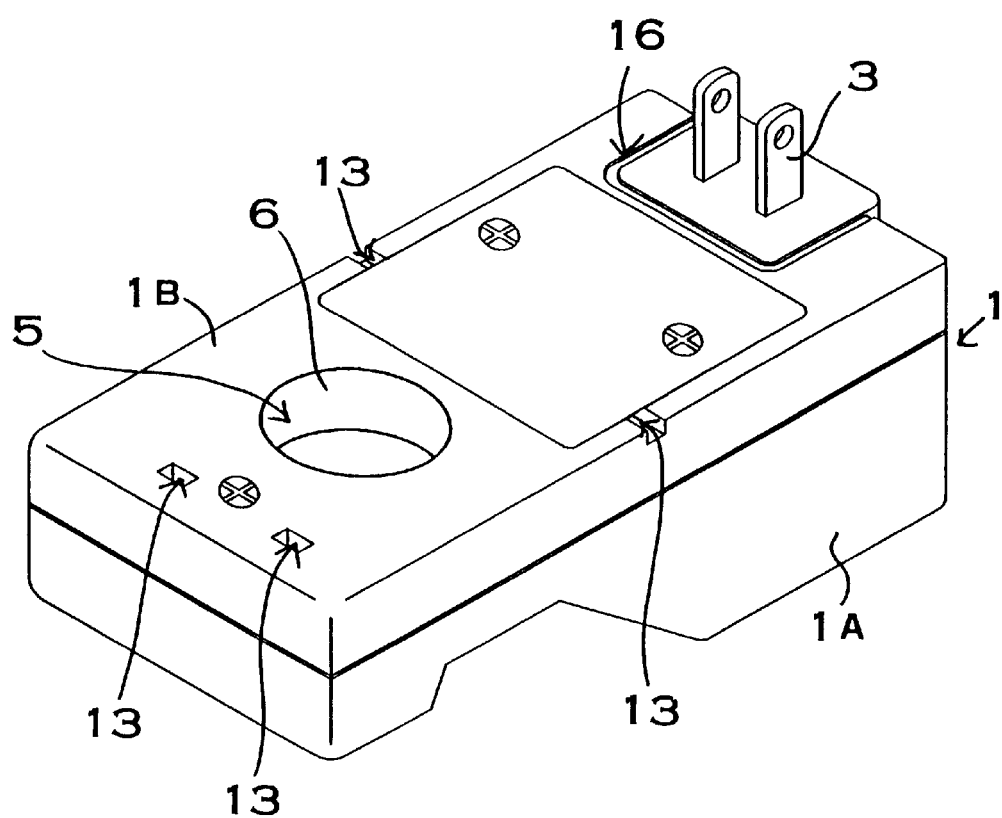

The charger shown in the FIG. 1 and in the FIG. 2 mounts a printed circuit board and a transformer inside the case 1 and further fixes plug blades 3 protruding from the bottom face of the case 1.

The case 1 is composed of the plastic made upper case 1A and lower case 1B. The upper case 1A is provided with the attachment section 4 on the upper face to mount the batteries. The lower case 1A and the upper case 1B close together mounting the printed circuit board inside.

The attachment section 4 is designed with a groove shape opened upwards, with a large perforation hole opened at the middle and further with the both side lateral walls shaped with a low central part allowing easy removing of the batteries. The perforation hole 5 of the attachment part 4 is blocked as shown in the FIG. 3 by the cylindrical ribs 6 built in one piece with the upper case 11 and the lower case 1B to avoid the penetration of fluid inside the case 1. The cylindrical ribs 6 are connected with no gap when the upper case 1A and the lower case 1B are connected, to avoid the penetration of electrolyte or the like via the perforation hole 5. Furthermore, the case 1 shown in the FIG. is provided with the vertical partition walls 7 located at the center of the attachment section 4 to allow the simultaneous installation of two cylindrical batteries in the attachment section 4.

The electrode windows 9 are opened at both extremities of the attachment section 4, as shown in the FIG. 4, with the positive and negative charging contact points 8 exposed outwards. The charging contact points 8 mounted in the electrode windows 9 are electrically connected to the positive and negative electrodes of the batteries which have been set into the attachment section 4 and charge the batteries. The charging contact points 8 are soldered onto the printed circuit board 2 and in contact with the charging circuit.

The printed circuit board 2 is mounted at a fixed position inside the case 1, nipped between the upper case 1A and the lower case 1B as show in the FIG. 3 and in the FIG. 4. The FIG. 3 is a vertical cross-sectional view across the center of the printed circuit board 2 and the FIG. 4 is a vertical cross-sectional view across the charging contact points 8. To nip the printed circuit board 2, the lower case 1B is built in one piece with the partition ribs 10, 15 protruding upwards on the inner face and nipping the printed circuit board 2. The upper case 1A is built in one piece with the separating ribs 11 which press the upper face of the printed circuit board 2. The printed circuit board 2 is nipped and fixed at a determined position by the partition ribs 10, 15 of the lower case 1B and by the separating ribs 11 of the upper case 1A.

Furthermore, as shown in the cross-sectional view of the FIG. 3, the printed circuit board 2 is opened with the central hole 2A which allows the cylindrical rib 6 to pass through. The cylindrical rib 6 is inserted into the central hole 2A then the printed circuit board 2 is mounted at a determined position in the case 1. Furthermore as shown in the FIG. 4, the perforation hole 2B which allows the separating rib 11 is also opened in the printed circuit board 2. The separating rib 11 is inserted here and the printed circuit board 2 is further surely mounted at the determined position.

The printed circuit board 2 fixes the positive and the negative charging contact points 8 with the shape shown in the FIG. 5 and FIG. 6. As shown in the FIG. 5, the positive side charging contact point 8 has a global L-shape and is fixed to the upper face of the printed circuit board 2. As shown in the FIG. 6, the negative side charging contact point 8 has a global L-shape with a the upper end bent downwards to allow the battery to be elastically pushed.

The FIG. 5 shows is a partial oblique view of the positive charging contact point region. This FIG. shows the separating rib 11 built in one piece in the upper case, separated from the upper case 1. In other words, this FIG. does not show the upper case but only the separating rib 11. As shown in the cross-sectional view of the FIG. 4, the separating rib 11 is built-in one piece with the upper case 1A. In the FIG. 5, the positive charging contact point 8 is fixed according to the FIG. on the inner side from the top left edge of the printed circuit board 2; the perforation hole 2B is opened on the top left side of the positive charging contact point 8. To avoid the spreading out of the fluid which has flown along the positive charging contact point 8 on the surface of the printed circuit board 2, the separating rib 11 is designed with a square shape inside of which fits the positive charging contact point 8. Furthermore, the separating rib 11 of this FIG. is provided with the U-shape protrusion 11A to be inserted inside the perforation hole 2B provided in the printed circuit board 2. The separating rib 11 of this shape fits perfectly as shown in the oblique view of the FIG. 4, from the upper face of the printed circuit board 2 to the inner face of the perforation hole 2B, then the fluid which has flown on the inner side of the separating rib 11 is guided downwards through the drain canal 12.

The fluid drained through the perforation hole 2B of the printed circuit board 2, flows outside through the bottom hole 13 composed of the drain canal 12 provided at the lower face of the lower case 1B. Therefore, as shown in the bottom view of the FIG. 7, the lower case 1B is opened with 4 bottom holes 13 on the bottom face. These bottom holes 13 are open exactly under the charging contact points 8. To avoid the spreading out of the fluid which has flown through the perforation hole 2B of the printed circuit board 2, along the lower face of the printed circuit board 2, the upper face of the partition rib 10, as shown in the FIG. 4, fits tightly to the lower face of the printed circuit board 2. In other words, the shape of the upper face of the partition rib 10 is designed so that it fits tightly the lower face of the printed circuit board 2. The bottom hole 13 is opened in the inner side of the partition rib 10. Furthermore, the lower edge of the separating rib 11 built in one piece with the upper case 1A of the case 1 shown in the FIG. 4, is designed to allow insertion inside the inner side of the partition rib 10 of the lower case 1B. The drain canals 12 of this structure surely drain outside the case the fluid of the electrolyte or the like which has flown inside the case along the charging contact points 8.

The FIG. 6 shows a partial oblique view of the negative charging contact point region. This FIG. as also the FIG. 5 shows the separating rib 11 built in one piece with the upper case, but separated from the upper case. The negative charging contact point 8 is fixed according to the FIG. at the top right edge of the printed circuit board 2 of this FIG., the drain canal 12 being located at the top right side of the edge. To avoid the spreading out of the fluid which has flown along the negative charging contact point 8 on the surface of the printed circuit board 2, the separating rib 11 is designed with a long and narrow U-shape inside of which fits the negative charging contact point 8. As shown in the oblique view of the FIG. 4, the separating rib 11 of this shape fits tightly from the upper face of the printed circuit board 2 to the edge, and drains downwards through the drain canal 12 of the edge of the printed circuit board 2, the fluid which has flown inside the separating rib 11.

The fluid that has passed the edge of the printed circuit board 2 is drained outside by the bottom hole 13 which forms the drain canal 12 provided on the bottom face of the lower case 1B. The partition rib 15 is designed along the inner face of the lower case 1B and with a shape parallel to it and the drain canal 12 is located between the partition rib 15 and the lower case 1B. The partition rib 15 which fits tightly to the bottom face of the printed circuit board 2 and drains out via the bottom holes 13 the fluid which has flown in the gap between the lower face of the printed circuit board 2 and the inner face of the separating rib 11 to avoid it to spread out along the bottom face of the printed circuit board 2, is provided on The upper face of the partition rig 15 builds in one piece with the lower case 1B the blocking plate 14 and right over the bottom hole 13. As shown in the oblique view of the FIG. 4, one part of the blocking plate 14 fits tightly to the lower face of the printed circuit board 2, but because the drain canal 12 is opened on both sides of the blocking plate 14, the fluid which flows through this drain canal is drained outside the case. To prevent the inside of the case to be exposed by the bottom hole 13, the blocking plate 14, because it is placed facing the bottom hole 13, finishes the external shape of the charger, and also prevents dust or the like from penetrating through the bottom hole.

Furthermore, the charger of the present invention, as shown in the FIG. 2 and in FIG. 7, is provided with the anti-flow groove 16 at the bottom face of the lower case 1B which surrounds the connecting plug blades 3 to be inserted into the electric power socket, and which prevents the flow of the electrolyte or the like which has leaked. As shown in these FIGS., the anti-flow groove 16 is designed with a U-shape surrounding the plug blades 3 and both extremities of the anti-flow groove 16 are extended to the lateral face of the case 1. The anti-flow groove 16 divides the bottom face of the lower case 1B in 2 regions, and isolates the plug blades 3 located in the region surrounded by the anti-flow groove 16 from the bottom holes 13 which are the drain canals 12 provided in the bottom face of the lower case 1B. For this reason, the anti-flow groove 16 prevents the electrolyte or the like which has flown out from bottom holes 13 through the drain canals 12, from flowing in the region of the plug blades 3 and then prevents efficiently the corrosion due to the contact of the plug blades 3 with the fluid of the electrolyte or the like which has been drained outside the case 1. But, the shape of the anti-flow groove is not specifies as a U-shape. The anti-flow groove can have any type of shapes which separates the bottom holes which are the drain canals from the plug blades.

By assembling the upper case and the lower case, the charger of the aforementioned structure has the characteristics to efficiently prevent the damages of the electrolyte or the like by mounting at the right and precise position on the surface of the printed circuit board, the separating ribs which avoid the spreading out of the fluid of the electrolyte or the like. This is because the separating ribs which are built in one piece with the upper case are placed at the position of contact with the upper face of the printed circuit board when the upper case and the lower case are assembled.

Furthermore, the charger of the aforementioned structure has the characteristics to efficiently prevent the corrosion due to the contact of the plug blades with the fluid of the electrolyte or the like drained outside the case because it is provided with the anti-flow groove which prevents the flow of the leaking fluid of the electrolyte or the like.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A charger comprising:
   a case having an upper surface defining a battery attachment section for attaching at least one battery, a plurality of electrode windows, and a plurality of drain passages in communication with said electrode windows, respectively, said drain passages being formed in said case for draining fluid which enters said case through said electrode windows;
   a printed circuit board mounted in said case;
   a plurality of charging contacts protruding through said electrode windows, respectively, each of said charging contacts being connected to said printed circuit board; and
   separating ribs extending from an inner surface of said case, wherein at least one of said separating ribs contacts an upper surface of said printed circuit board and surrounds at least one of said charging contacts so that fluid entering said case through said electrode windows is prevented from spreading along an upper surface of said printed circuit board by said separating ribs.

2. The charger as claimed in claim 1, further comprising a pair of plug blades projecting through an outer surface of said case, and a U-shaped flow groove extending from an edge of said outer surface of said case and surrounding said plug blades so as to prevent fluid from contacting said plug blades.

3. The charger as claimed in claim 1, wherein said case is formed of plastic and comprises an upper case section and a lower case section, and said separating ribs are formed integrally with said upper case section.

4. The charger as claimed in claim 3, wherein said printed circuit board is interposed between said upper and lower case sections so as to fix said printed circuit board in said case.

5. The charger as claimed in claim 4, further comprising partition ribs formed integrally with said lower case section, said partition ribs extending upwardly from an inner surface of said lower case section and engaging a lower surface of said printed circuit board, wherein said printed circuit board is fixed in said case due to engagement with said partition ribs on said lower case section and with said separating ribs on said upper case section.

6. The charger as claimed in claim 5, wherein one of said partition ribs, disposed adjacent a first end of said lower case section, is parallel to an inner face of an upstanding wall formed at said first end of said lower case section.

7. The charger as claimed in claim 6, wherein said partition ribs abut said lower face of said printed circuit board and can direct fluid to outlets formed in said lower case section.

8. The charger as claimed in claim 3, wherein said lower case section includes a plurality of outlet openings.

9. The charger as claimed in claim 8, wherein at least one of said outlet openings is surrounded by one of said partition ribs.

10. The charger as claimed in claim 8, further comprising a number of blocking plates positioned over a corresponding number of said outlet openings, respectively, said blocking plates being formed integrally with one of said partition ribs which is formed at a first end of said lower case section.

11. A charger comprising:
    a case having an upper surface defining a battery attachment section for attaching at least one battery, a plurality of electrode windows, and a plurality of drain passages in communication with said electrode windows, respectively, said drain passages being formed in said case for draining fluid which enters said case through said electrode windows;

a printed circuit board mounted in said case;

a plurality of charging contacts protruding through said electrode windows, respectively, each of said charging contacts being connected to said printed circuit board; and separating ribs extending from an inner surface of said case and contacting an upper face of said printed circuit board, wherein fluid entering said case through said electrode windows is prevented from spreading along an upper surface of said printed circuit board by said separating ribs, and each of said separating ribs is U-shaped and is located in the vicinity of an edge of said printed circuit board.

12. A charger comprising:

a case having an upper surface defining a battery attachment section for attaching at least one battery, a plurality of electrode windows, and a plurality of drain passages in communication with said electrode windows, respectively, said drain passages being formed in said case for draining fluid which enters said case through said electrode windows;

a printed circuit board mounted in said case;

a plurality of charging contacts protruding through said electrode windows, respectively, each of said charging contacts being connected to said printed circuit board;

separating ribs extending from an inner surface of said case and contacting an upper face of said printed circuit board, wherein fluid entering said case through said electrode windows is prevented from spreading along an upper surface of said printed circuit board by said separating ribs; and a plurality of through holes formed in said printed circuit board, wherein each of said through holes is surrounded by one of said separating ribs.

13. A charger comprising:

a case having an upper surface defining a battery attachment section for attaching at least one battery, a plurality of electrode windows, and a plurality of drain passages in communication with said electrode windows, respectively, said drain passages being formed in said case for draining fluid which enters said case through said electrode windows;

a central opening extending through said case and located in said battery attachment section;

a printed circuit board mounted in said case;

a plurality of charging contacts protruding through said electrode windows, respectively, each of said charging contacts being connected to said printed circuit board; and separating ribs extending from an inner surface of said case and contacting an upper face of said printed circuit board, wherein fluid entering said case through said electrode windows is prevented from spreading along an upper surface of said printed circuit board by said separating ribs.

14. The charger as claimed in claim 13, wherein said central opening is defined by a cylindrical rib extending between an upper and lower wall of said case.

15. A charger comprising:

a case having an upper surface defining a battery attachment section for attaching at least one battery, a plurality of electrode windows, and a plurality of drain passages in communication with said electrode windows, respectively, said drain passages being formed in said case for draining fluid which enters said case through said electrode windows;

a printed circuit board mounted in said case;

a plurality of charging contacts protruding through said electrode windows, respectively, each of said charging contacts being connected to said printed circuit board; and separating ribs extending from an inner surface of said case and contacting an upper face of said printed circuit board, wherein fluid entering said case through said electrode windows is prevented from spreading along an upper surface of said printed circuit board by said separating ribs, wherein said printed circuit board includes a plurality of through holes, each of said through holes is associated with one of said separating ribs, and each of said separating ribs associated with said through holes includes a protrusion which is inserted in said associated through hole.

16. The charger as claimed in claim 15, wherein inner surfaces of said separating rib protrusions form fluid drain passages.

* * * * *